3,356,610
METHOD FOR TREATMENT OF WATER TO EFFECT PURIFICATION AND PREVENT FIRES

Marcel Maestre, Fresnes, Maurice Lefebvre, Sevres, and Claude Kaziz, La Courneuve, France, assignors to Produits Chimiques Pechiney-Saint-Gobain, Neuilly-sur-Seine, France
No Drawing. Filed June 16, 1964, Ser. No. 375,647
Claims priority, application France, June 18, 1963, 938,515
15 Claims. (Cl. 252—8)

ABSTRACT OF THE DISCLOSURE

This invention is addressed to the treatment of bodies of water having combustible or other undesirable organic substances on the surface thereof by application of a liquid composition containing a partially or completely halogenated butadiene, butane, butene, pentane, pentene, cyclopentene, cyclopentane or cyclopentadiene or the condensation reaction products of trichloroethylene and carbon tetrachloride and mixtures of trichlorobenzenes, 1,2,4-trichlorobenzene and perchloroethylene formulated into a liquid composition having a specific gravity greater than 1.3 and preferably greater than 1.5 and a boiling point greater than 100° and preferably greater than 150° C., with or without a wetting agent, whereby the composition is applied as by spraying onto the surface of the water in an amount to effect submergence of the undesirable or inflammable organic substances.

---

This invention relates to the prevention of pollution and of fires over bodies of water and it relates more particularly to the method for use in the treatment of bodies of water to prevent pollution by organic substances and to prevent combustion of bodies of water covered with flammable liquids, such as hydrocarbons and organic substances having oxygenated functions, such as ketones, aldehydes, alcohols, and the like.

The invention is also addressed to the method for the treatment for purification to improve the hygienic or health conditions of bodies of water contaminated with flammable or non-flammable organic substances which introduce impurities into the water and often give off noxious or toxic fumes.

It is an object of this invention to provide a composition and method for use in the treatment of bodies of water to overcome pollution and to prevent fires and it is a related object to provide a composition and method for the treatment to improve the hygienic and health conditions in bodies of water polluted with organic substances which give off noxious or toxic fumes, and to provide a composition and method for treatment to prevent fires over bodies of water contaminated or covered with flammable organic substances.

More specifically, it is an object of this invention to provide a composition in the form of a liquid containing at least one halogenated organic liquid fire-resistant compound or a composition consisting essentially of same for application onto bodies of water to effect purification when the water is polluted with organic substances or to prevent fires when the water is polluted or covered with a flammable organic substance.

In accordance with the practice of this invention, the body of water, polluted as by a layer of flammable or non-flammable organic substance, is treated with a liquid formulated to contain, preferably in whole or at least in part, at least one organic halogenated compound selected from the group consisting of a partially or fully halogenated derivative of butadiene and particularly bromochlorofluorides, bromochlorides, bromofluorides, chlorofluorides, or chlorides of butadiene, as represented by tetrachlorobutadienes and hexachlorobutadiene; bromochlorinated, chlorinated and brominated, and particularly dibrominated, derivatives of butane, pentane, pentene, cyclopentene, cyclopentane, and cyclopentadiene, such as hexachlorocyclopentadiene, or the condensation reaction products of trichloroethylene and carbon tetrachloride (Prins reaction); and mixtures of trichlorobenzenes; 1,2,4-trichlorobenzene and perchlorethylene. The treating liquid is applied in amounts sufficient substantially completely to submerge all of the major portion of the combustible material or polluting substance on the body of water. Thus the treatment described can be used to extinguish an existing fire or to prevent combustion of a layer of combustible hydrocarbons which has not yet caught on fire.

Many organic liquids not only pollute waters but also give off offensive odors or toxic fumes into the atmosphere. The described treatment finds advantageous use in the purification of polluted waters to clear the atmosphere immediately surrounding such polluted waters, as by application to submerge the polluting substances thereby to prevent vaporization thereof into the atmosphere.

The organic liquid composition employed in the practice of this invention should be selected and formulated to have a density or specific gravity above 1.3 and preferably above 1.5. It should have a boiling point above 100° C. and preferably above 150° C. and it should be fire-resistant.

The organic liquid can advantageously be employed in admixture with other well known fire extinguishing agents preferably selected to form a homogeneous system. Such fire extinguishing agents may be selected of saturated hydrocarbons having from 1 to 2 carbon atoms and which are partially or fully substituted by bromine, chlorine or fluorine atoms, and particularly chlorobromides and chlorofluorobromides of methane and ethane.

The ratio or organic liquid compound to fire extinguishing agent may be varied over a fairly wide range depending upon the efficiency of the fire extinguishing agent, the properties required of the constituents and the cost of the organic liquid compound. Mixtures made up of at least 35% by weight organic liquid compound to less than 65% by weight of extinguishing agent have been found effective to bring a fire under control in short order. The amount of liquid organic compound may be as high as to make up 100% by weight of the treating composition and in such instances, it is preferred to make use of a material such as hexachlorobutadiene.

Benefit can also be derived in the formulation of the compositions of this invention to contain one or more surface active or tensio-active agents to enhance the spreading as a foam over the fired areas or surfaces contaminated with the organic polluting substance. In such instances where the organic substance is to be placed on the bottom of the body of water, it has been found to be advantageous to formulate the organic liquid compound to include at least one tensio-active agent, preferably of the non-foaming type. Such tensio-active agent can be selected from the ionic tensio-active or surface active agents and preferably of the anionic substances.

It is preferred to formulate the composition to contain non-ionic tensio-active agents, as represented by the class of compounds including nonylphenols of polyethylene glycol; nonylphenols of oxyethylenes; fatty acid esters of alcohol ethers; and alkylphenyl polyethoxy ethers.

The ratio of such surface active or tensio-active agents may be varied over a fairly wide range depending upon the nature and activity of the selected surface active agent and its cost. In practice, it is desirable to formulate the composition to contain the surface active agent in an amount within the range of 0.1 to 5% by weight of liquid composition.

It has been found that, sometimes in the absence of one or more surface active agents in the composition, it becomes difficult, when spraying the liquid compound, to submerge the last traces of the organic substances spread as a layer on the water. On the other hand, when the same liquid composition is formulated to contain one or more surface or tensio-active agents of the type described, the submergence of the organic substances on the surface of the water is greatly facilitated, especially with respect to the last traces, thereby to enable more complete purification of the water.

By way of still further modification, the addition of a perfume in the amount of 1 to a few percent will be useful to persons handling such compositions, so as to enable them to detect and indicate the presence of these compositions.

In use, the compositions of this invention can be packaged in pressurized or aerosol containers, using nitrogen, carbon dioxide, or fluorohalogenated hydrocarbons of low boiling point, such as dichlorodifluoromethane, difluorochlorobromomethane, or other freons as the propellants for spraying onto the contaminated surface.

The liquid compound of this invention can be applied in many other well known ways and particularly by atomization or spraying.

The following are examples of the practice of this invention and they are given by way of illustration and not by way of limitation to illustrate satisfactory solutions to serious problems of pollution of surface streams or bodies of water with organic substances, such as oils, which not only present a nuisance but also a danger to the property and people in the near vicinity.

*Example 1*

Composition: 100% hexachlorobutadiene with nitrogen propellant under partial pressure of 5 bars.

*Example 2*

| Composition: | Percent by weight |
|---|---|
| Hexachlorobutadiene | 76.6 |
| Dichlorodifluoromethane | 23.3 |

*Example 3*

| Composition: | Percent by weight |
|---|---|
| Hexachlorobutadiene | 50 |
| Dichlorodifluoromethane | 10 |
| Difluorochlorobromomethane | 40 |

In one series of tests, 1 kilogram of a hydrocarbon oil was introduced into a tank having an area of 20 square decimeters and containing 20 liters of water.

In separate tests, each of the compositions of Examples 1–3 was applied by spraying until the hydrocarbon oil was submerged with the applied composition to the bottom of the tank. The results are set forth in the following Table I:

TABLE I

Example: Weight in kg. of liquid composition necessary to submerge hydrocarbon oil

| 1 | 0.825 |
|---|---|
| 2 | 1.030 |
| 3 | 1.750 |

*Examples 4–6*

In another series of tests 1 kilogram of a distillation fraction of petroleum hydrocarbon between 110–160° C. and having a density of .742 at 15° C. was introduced into the tank instead of the hydrocarbon oil of Examples 1–3, and the same compositions as in Examples 1–3 were applied. The results are given in the following Table I-a:

TABLE I-a

Example: Weight in kg. of liquid composition necessary to submerge hydrocarbon oil

| 1 | 2.000 |
|---|---|
| 2 | 2,510 |
| 3 | 2.290 |

*Examples 7–11*

Fire extinguishing tests were conducted on a fire contained in a cylindrical tank formed with sheet metal walls having a thickness of .20 cm., an inside diameter of 56 cm., and a height of 10 cm. The tank contained 20 liters of sea water with one liter of oil introduced for each test.

The different mixtures, the compositions of which are indicated in Table II, were placed under pressure in cylindrical steel jackets having a capacity of 0.4 liter and which was provided with a nozzle for spraying.

In Example 9, the propellant is nitrogen with an absolute pressure of 6 bars at 20° C. In Example 11, the propellant is nitrogen with an absolute pressure of 8 bars at 20° C.

In each test, the oil was inflamed with the aid of 100 cc. of ether.

The results of the fire extinguishing tests are likewise set forth in the following Table II:

TABLE II

| Composition of the extinguishing mixture (percent by weight) | Examples | | | | |
|---|---|---|---|---|---|
| | 7 | 8 | 9 | 10 | 11 |
| Hexachlorobutadiene | 40 | 50 | 50 | 40 | 40 |
| CBrClF$_2$ | 40 | 40 | 50 | 50 | 60 |
| CCl$_2$F$_2$ | 20 | 10 | | 10 | |
| Time, in seconds, to extinguish | 4 | 4 | 4 | 5 | 4 |
| Time, in seconds, for total draining of the extinguisher | 12 | 11 | 24 | 11 | 11 |
| Weight, in grams, of the charge necessary to extinguish | 155 | 170 | 77.2 | 211 | 169 |

With an extinguishing mixture made up of 80% by weight CBrClF$_2$ and 20% by weight CCl$_2$F$_2$ under conditions identical to the preceding Examples 7–11, 170 grams of the mixture or 136 grams of CBrClF$_2$ were needed to extinguish the fire. On the other hand, in Examples 7–11, the quantity of CBrClF$_2$ consumed only varies within the range of 39 and 105 grams.

*Examples 12–15*

The extinguishing mixtures, the compositions of which are given in Table III below, were used in treatment in a manner identical to that of Examples 7–11.

The results in the extinguishing of the fire are likewise given in Table III.

TABLE III

| Composition of the extinguisher mixture | Examples | | | |
|---|---|---|---|---|
| | 12 | 13 | 14 | 15 |
| Perchlorethylene | 40 | | | |
| Tetrachlorobutadiene | | 40 | | |
| Nonachloropentene | | | 40 | |
| Hexachlorocyclopentadiene | | | | 40 |
| CBrClF$_2$ | 40 | 40 | 40 | 40 |
| CCl$_2$F$_2$ | 20 | 20 | 20 | 20 |
| Time, in seconds, to extinguish | 8 | 7 | 4 | 4 |
| Time, in seconds, for total draining of the extinguisher | 13 | 11 | 10 | 10 |
| Weight, in grams, of the charge necessary to extinguish | 286 | 295 | 186 | 186 |

*Examples 16–19*

In a cylindrical tank having a diameter of 200 cm. and containing 20 liters of ocean water, 5 kg. of oil was introduced. The oil immediately formed a layer on top of the sea water.

Immersion tests were carried out by treatment to apply onto the surface a liquid composition of the following formulation:

| | Percent by weight |
|---|---|
| Hexachlorobutadiene | 99 |
| Propylene glycol monostearate | 1 |

The composition is applied by spraying under nitrogen pressure. After applying 5 kg. of the mixture, only some scattered traces of oil remain on the surface of the sea water. Upon continued spraying, the entire oil layer is caused to be carried to the bottom after a total of 8 kg. of the composition has been applied.

The foregoing is repeated but with a liquid composition having the following constituents:

| | Percent by weight |
|---|---|
| Hexachlorobutadiene | 97 |
| Propylene glycol monostearate | 3 |

After applying 5 kg. of the mixture, only some scattered traces of oil remain on the surface of the sea water.

Upon continued application, the entire oil layer is submerged to the bottom of the tank when a total of 8 kg. of this mixture is applied.

In a further test, the submersion of the oil is effected with hexachlorobutadiene alone, in the absence of any tensio or surface active agent. After application of 5 kg. of the hexachlorobutadiene, very noticeable amounts of oil still remain on the surface of the sea water. Upon continued spraying to apply 8 kg. of hexachlorobutadiene, scattered stains of oil still remain on the surface.

The foregoing indicates that it is advantageous to carry out the purification in the presence of tensio-active agents if it is desired to submerge the entire oil component to the bottom of the body of water.

The three submersion tests described were observed over a period of six months. The sea water remained clear and the conditions on its surface remained perfectly clean and unchanged over the entire period.

It will be apparent from the foregoing that we have provided a new and novel composition and means for the treatment of bodies of water to effect purification and to prevent fires when the waters are covered in whole or in part with combustible organic substances or organic substances which tend to pollute the water or the atmosphere immediately surrounding the water. It will be apparent from the foregoing that we have provided a new and novel composition and means which operates effectively to remove the polluting or contaminating material from the surface of the water and to submerge the material into the body of water where it no longer presents the dangers of fire or contamination such that substantially complete purification can be achieved in a simple and efficient manner and in relatively short order.

It will be understood that changes may be made in the details of formulation and application without departing from the spirit of the invention, especially as defined in the following claims.

We claim:
1. In the process for the treatment of bodies of water having organic substances on the surface thereof to effect purification or to prevent combustion, the step of applying onto the surface of the body of water a liquid composition, an essential ingredient of which consists of a halogenated organic compound in which the organic base is selected from the group consisting of a butadiene, butane, pentane, pentene, cyclopentene, cyclopentane and cyclopentadiene, and in which the halogen is selected from the group consisting of chlorine, bromine and fluorine and mixtures thereof, and in which the organic liquid composition has a specific gravity of at least 1.3 and is applied in an amount to effect submergence of the organic substances.

2. In the process for the treatment of bodies of water having organic substances on the surface thereof to effect purification or to prevent combustion, the step of applying onto the surface of the body of water a liquid composition, an essential ingredient of which consists of a halogenated organic compound in which the organic base is selected from the group consisting of a butadiene, butane, pentane, pentene, cyclopentene, cyclopentane and cyclopentadiene, and in which the halogen is selected from the group consisting of chlorine, bromine and fluorine and mixtures thereof, and in which the organic liquid composition has a specific gravity of at least 1.5 and a boiling point of at least 150° C., and is applied in an amount to effect submergence of the organic substances.

3. In the process for the treatment of bodies of water having organic substances on the surfaces thereof to effect submergence of the organic substances on the body of water for purification of the body of water or to prevent combustion of the organic substances, comprising the step of applying onto the surface of the body of water a liquid composition, an essential ingredient of which consists of a halogenated organic compound in which the organic portion is selected from the group consisting of a butadiene, butane, pentane, pentene, cyclopentene, cyclopentane and cyclopentadiene, and in which the halogen is selected from the group consisting of chlorine, bromine and fluorine and mixtures thereof, and in which the organic liquid composition has a specific gravity of at least 1.3 and a boiling point of at least 100° C. and is applied in an amount to effect submergence of the organic substances.

4. The process as claimed in claim 3 in which the liquid composition has a specific gravity of at least 1.5.

5. The process in claim 3 in which the liquid composition has a boiling point of at least 150° C.

6. The process as claimed in claim 3 in which the halogenated organic compound is a fully halogenated organic compound.

7. The process as claimed in claim 3 in which the halogenated organic compound is a partially halogenated organic compound.

8. The process as claimed in claim 3 in which the liquid composition is formed entirely of the halogenated organic compound.

9. The process as claimed in claim 1 in which the halogenated organic compound is present in admixture with a halogenated organic hydrocarbon having from 1 to 2 carbon atoms, and in which the hydrocarbon is halogenated with a halogen selected from the group consisting of chlorine, bromine and fluorine and mixtures thereof.

10. The process as claimed in claim 9 in which the halogenated organic compound comprises at least 35% by weight of the liquid composition and the halogenated hydrocarbon of from 1 to 2 carbon atoms comprises the remainder of the liquid composition.

11. The process as claimed in claim 3 in which the liquid composition is formulated to contain a surface active agent.

12. The process as claimed in claim 11 in which the surface active agent is present in an amount within the range of 0.1 to 5% by weight.

13. The process as claimed in claim 3 in which the halogenated organic compound is hexachlorobutadiene.

14. The process as claimed in claim 3 in which the liquid composition is applied by spraying onto the body of water.

15. In the process for the treatment of bodies of water having organic substances on the surface thereof to effect purification or to prevent combustion, the step of applying onto the surface of the body of water a liquid composition the essential ingredients of which consist of a mixture of trichlorobenzenes; 1,2,4-trichlorobenzene and perchloroethylene, and in which the organic liquid composition has a specific gravity of at least 1.3 and is applied in an amount to effect submergence of the organic substances.

References Cited

UNITED STATES PATENTS

| | | | |
|---|---|---|---|
| 1,255,618 | 2/1918 | Lepine | 252—2 XR |
| 1,393,124 | 10/1921 | Henning | 252—364 |
| 1,817,893 | 8/1931 | Curme | 252—364 |
| 2,254,469 | 9/1941 | Bjorksten | 252—364 |
| 2,464,204 | 3/1949 | Baker | 210—36 |
| 2,681,941 | 6/1954 | Buh et al. | 252—2 XR |
| 2,761,563 | 9/1956 | Delft | 210—21 |
| 2,897,151 | 7/1959 | Birkett | 252—2 XR |
| 3,080,430 | 3/1963 | Cohen | 252—2 XR |

FOREIGN PATENTS

| | | |
|---|---|---|
| 1,281,341 | 12/1961 | France. |
| 1,282,612 | 12/1961 | France. |
| 1,301,917 | 7/1962 | France. |

LEON D. ROSDOL, *Primary Examiner.*

MAYER WEINBLATT, *Examiner.*